US008751367B2

(12) United States Patent
Sturm et al.

(10) Patent No.: US 8,751,367 B2
(45) Date of Patent: Jun. 10, 2014

(54) ZERO COUPON CONVERSION FACTOR CALCULATION

(71) Applicant: Chicago Mercantile Exchange Inc., Chicago, IL (US)

(72) Inventors: Frederick Sturm, Chicago, IL (US); Daniel Grombacher, Evanston, IL (US); James Boudreault, Palatine, IL (US); Michael P. Kamradt, Flossmoor, IL (US); John Labuszewski, Westmont, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 31 days.

(21) Appl. No.: 13/633,660

(22) Filed: Oct. 2, 2012

(65) Prior Publication Data
US 2013/0117169 A1 May 9, 2013

Related U.S. Application Data

(63) Continuation-in-part of application No. 13/291,618, filed on Nov. 8, 2011.

(51) Int. Cl.
*G06Q 40/00* (2012.01)
(52) U.S. Cl.
USPC ............................ 705/37; 705/35; 705/36 R
(58) Field of Classification Search
USPC .................................................... 705/35–37
See application file for complete search history.

(56) References Cited

U.S. PATENT DOCUMENTS 8,285,628 B1 * 10/2012 Graff et al. ..................... 705/37
8,407,123 B2 * 3/2013 Jacoby .......................... 705/35
2006/0224493 A1 * 10/2006 Pinkava ......................... 705/37

OTHER PUBLICATIONS

NPL1: CME Group Dec. 2008.*
NPL2: Fabozzi, Dec. 2010.*
Yield Measures, Spot Rates, and Forward Rates;by Frank J. Fabozzi;Copyright 2007 John Wiley & Sons, Inc.*
Labuszewski et al. "Understanding U.S. Treasury Futures", CME Group, Accessed Aug. 1, 2012.

* cited by examiner

*Primary Examiner* — Hani M Kazimi
*Assistant Examiner* — Abhishek Vyas
(74) *Attorney, Agent, or Firm* — Lempia Summerfield Katz LLC

(57) ABSTRACT

The disclosed embodiments relate to a system which calculates a conversion factor (CF) based upon a zero percent (0%) futures contract standard. The zero percent futures contract standard may be used in the context of futures or forwards based upon coupon bearing debt securities including Treasuries, Treasury Inflation Protected Securities (TIPS), agencies, corporates, municipals, or any fixed income security. The system also facilitates listing, trading, and settlement of an interest rate futures contract that sets forth such a zero percent futures contract standard. The system may be configured for both interest rate futures contracts utilizing a nonzero percent futures contract standard and interest rate futures contract utilizing a zero percent futures contract standard. The system may be configured to calculate an invoice amount for the interest rate futures contract to be paid in exchange for the delivery of the one of the set of eligible interest rate or debt securities and instruments.

25 Claims, 5 Drawing Sheets

|  | 2-Year T-Note Futures | 3-Year T-Note Futures | 5-Year T-Note Futures | 10-Year T-Note Futures | Classic T-Bond Futures | Ultra T-Bond Futures |
|---|---|---|---|---|---|---|
| Contract Size | $200,000 face-value U.S. Treasury notes | $200,000 face-value U.S. Treasury notes | $100,000 face-value U.S. Treasury notes | $100,000 face-value U.S. Treasury notes | $100,000 face-value U.S. Treasury bonds | $100,000 face-value U.S. Treasury bonds |
| Delivery Grade | T-notes with original maturity of not more than 5 years and 3 months and remaining maturity of not less than 1 year and 9 months from 1st day of delivery month but not more than 2 years from last day of delivery month | T-Notes with original maturity of not more than 5-1/4 years and a remaining maturity of not less than 2 years, 9 months from last day of delivery month | T-notes with original maturity of not more than 5 years and 3 months and remaining maturity of not less than 4 years, 2 months as of 1st day of delivery month. | T-notes maturing at least 6-½ years but not more than 10 years, from 1st day of delivery month. | T-bonds with remaining maturity of at least 15 years, but no more than 25 years. | T-bonds with remaining maturity of at least 25 years but no more than 30 years |
| Invoice Price | Invoice price = settlement price x conversion factor (CF) + accrued interest | | | | | |
| Delivery Method | Via Federal Reserve book-entry wire-transfer | | | | | |
| Contract Months | March quarterly cycle – March, June, September, December | | | | | |
| Trading Hours | Open Auction: 7:20 am-2:00 pm, Monday-Friday; Electronic: 6:00 pm – 4:00 pm, Sunday-Friday (Central Times) | | | | | |
| Last Trading & Delivery Day | Business day preceding last 7 business days of month; last delivery day is last business day of delivery month | | | | | |
| Price Quote | In percent of par to one-quarter of 1/32nd of 1% of par ($15.625 rounded up to nearest cent) | | Quoted in percent of par to one-half of 1/32nd of 1% of par ($15.625 rounded up to nearest cent) | | Quoted in percent of par to 1/32nd of 1% of par ($31.25) | |

ZERO COUPON CONVERSION FACTOR CALCULATION

REFERENCE TO RELATED APPLICATION

This application is a continuation-in-part under 37 C.F.R. §1.53(b) of U.S. patent application Ser. No. 13/291,618, filed Nov. 8, 2011, the entire disclosure of which is hereby incorporated by reference.

BACKGROUND

Interest rate futures contracts, and in particular, Treasury futures, are contracts to sell or buy debt instruments, such as U.S. Treasury bonds or notes, at a future date. Anyone holding a position in an expiring Treasury futures contract during its delivery month must be prepared to fulfill the contractual obligation to deliver, or to take delivery of, the underlying deliverable grade Treasury securities, discussed in more detail below. For this reason, delivery on contract—or the prospect of it—may be considered the chief determinant of prices at which Treasury futures trade.

Presently, the Treasury futures complex is neither intended nor organized to serve as a primary marketplace for the transfer of ownership of cash Treasury securities. Yet, the ever-present possibility of transfer via physical delivery means that futures contract prices are inextricably linked to cash market prices. Thus, physical delivery into Treasury futures may be considered, at once, infrequent yet pivotal.

Hedgers—those who use Treasury futures chiefly to lay off interest rate risk exposure rather than to acquire it—are seldom interested in using futures as a means of transacting Treasury securities. For this reason, hedgers typically liquidate their outstanding futures positions before the contracts enter their delivery cycle.

The majority of such liquidations are rolled. That is, the liquidating trades in the expiring contract are combined with trades that initiate corresponding new positions in the next following (or "deferred") contract delivery month. For example, a market participant with an outstanding long position in an expiring futures contract would sell it, netting the position to zero. Simultaneously, the trader would establish a new long position in the deferred contract, equivalent in scale to the position in the expiring contract that the trader has just liquidated.

The practice of rolling is prevalent. Accordingly, only a small share of Treasury futures held by market participants may result in physical delivery—historically, around 3.6 percent. For the same reason, an expiring Treasury futures contract's open interest tends to have shrunk by half by the time the contract's physical delivery cycle commences.

The terms and conditions for each Treasury futures contract specify its deliverable grade, i.e., the securities that a short position holder may deliver at contract expiration for sale to a long position holder to fulfill the delivery obligation. These deliverable grade securities—Treasury notes and bonds—are debt instruments backed by the full faith and credit of the U.S. government. Under the current rules, any Treasury security may be tendered for delivery, as long as it meets the futures contract's criteria for delivery suitability. Typically, several securities are eligible and, from one contract expiry to the next, their number may vary with the frequency of issuance of notes and bonds by the U.S. Treasury.

For example, regarding Long Term U.S. Treasury Bond Futures, according to rule 40101.A. of the Chicago Board of Trade Rulebook, "[t]he contract grade for delivery on futures made under these Rules shall be U.S. Treasury fixed principal bonds which have fixed semi-annual coupon payments, and which have a remaining term to maturity of at least 25 years. For the purpose of determining a U.S. Treasury security's eligibility for contract grade, its remaining term to maturity shall be calculated from the first day of the contract's named month of expiration, and shall be rounded down to the nearest three-month increment (e.g., 12 years 5 months 18 days shall be taken to be 12 years 3 months). New issues of U.S. Treasury securities that satisfy the standards in this Rule shall be added to the contract grade as they are issued. Notwithstanding the foregoing, the Exchange shall have the right to exclude any new issue from the contract grade or to further limit outstanding issues from the contract grade."

Further, with respect to Long Term U.S. Treasury Bond Futures, according to rule 40101.B. of the Chicago Board of Trade Rulebook, "[e]ach individual contract lot that is delivered must be composed of one and only one contract grade Treasury bond issue. The amount at which the short Clearing Member making delivery shall invoice the long Clearing Member taking delivery of said securities (Rule 40105.A.) shall be determined as:

$$\text{Invoice Amount} = (\$1000 \times P \times c) + \text{Accrued Interest}$$

where

P is the contract daily settlement price on the day that the short Clearing Member gives the Clearing House notice of intention to deliver (Rule 40104.A.). P shall be expressed in points and fractions of points with par on the basis of 100 points (Rule 40102.C.); and c is a conversion factor equal to the price at which a security with the same time to maturity as said security (as per Rule 40101.A.), and with the same coupon rate as said security, and with par on the basis of one (1) point, will yield 6% per annum according to conversion factor tables prepared and published by the Exchange.

For each individual contract lot that is delivered, the product expression ($1000×P×c) shall be rounded to the nearest cent, with half-cents rounded up to the nearest cent. Example: Assume that P is 100 and $^{25}/_{32}$nds. Assume that c is 0.9633. The product expression ($1000×P×c) is found to be $97,082.578125. The rounded amount that enters into determination of the Invoice Amount is $97,082.58. In the determination of the Invoice Amount for each individual contract lot being delivered, Accrued Interest shall be charged to the long Clearing Member taking delivery by the short Clearing Member making delivery, in accordance with 31 CFR Part 306—General Regulations Governing U.S. Securities, Subpart E—Interest."

Regarding short term U.S. Treasury Note Futures, according to rule 21101.A. of the Chicago Board of Trade Rulebook, "[t]he contract grade for delivery on futures made under these Rules shall be U.S. Treasury fixed-principal notes which have fixed semi-annual coupon payments, and which have:

(a) an original term to maturity (i.e., term to maturity at issue) of not more than 5 years 3 months; and (b) a remaining term to maturity of not more than 2 years; and (c) a remaining term to maturity of not less than 1 year 9 months.

For the purpose of determining a U.S. Treasury note's eligibility for contract grade, its remaining term to maturity shall be calculated from the first day of the contract's named month of expiration, and shall be rounded down to the nearest one-month increment (e.g., 1 year 10 months 17 days shall be taken to be 1 year 10 months). New issues of U.S. Treasury notes that satisfy the standards in this Rule shall be added to the contract grade as they are issued. If the U.S. Treasury Department auctions and issues a Treasury security that meets these standards, such that said security is a re-opening of an extant Treasury issue that had not previously met these standards, then the extant Treasury issue shall be deemed to be a Treasury note meeting these standards and shall be added to the contract grade as of the issue date of said newly auctioned Treasury security. Notwithstanding the foregoing, the Exchange shall have the right to exclude any new issue from the contract grade or to further limit outstanding issues from the contract grade."

Further, with respect to short term U.S. Treasury Note Futures, according to rule 21101.B of the Chicago Board of Trade Rulebook, "[e]ach individual contract lot that is delivered must be composed of one and only one contract grade Treasury note issue. The amount at which the short Clearing Member making delivery shall invoice the long Clearing Member taking delivery of said notes (Rule 21105.A.) shall be determined as:

Invoice Amount=($2000×P×c)+Accrued Interest where

P is the contract daily settlement price on the day that the short Clearing Member gives the Clearing House notice of intention to deliver (Rule 21104.A.). P shall be expressed in points and fractions of points with par on the basis of 100 points (Rule 21102.C.); and c is a conversion factor equal to the price at which a note with the same time to maturity as said note, and with the same coupon rate as said note, and with par on the basis of one (1) point, will yield 6% per annum according to conversion factor tables prepared and published by the Exchange.

For each individual contract lot that is delivered, the product expression ($2000×P×c) shall be rounded to the nearest cent, with half-cents rounded up to the nearest cent. Example: Assume that P is 100 and $25 \cdot 5/32$nds. Assume that c is 0.9633. The product expression ($2000×P×c) is found to be $194, 195.26259375. The rounded amount that enters into determination of the Invoice Amount is $194,195.26. In the determination n of the Invoice Amount for each individual contract lot being delivered, Accrued Interest shall be charged to the long Clearing Member taking delivery by the short Clearing Member making delivery, in accordance with 31 CFR Part 306—General Regulations Governing U.S. Securities, Subpart E—Interest."

With respect to Treasury Note and Bond futures listed for trading on the Chicago Board of Trade, updated U.S. Treasury conversion factors are periodically published by the Exchange, which have historically been based upon an 8% or 6% yield.

BRIEF DESCRIPTION OF THE DRAWINGS

FIG. 1 depicts a table of the contract specifications of example Treasury futures contracts.

DETAILED DESCRIPTION OF THE DRAWINGS AND PRESENTLY PREFERRED EMBODIMENTS

Figure 2:
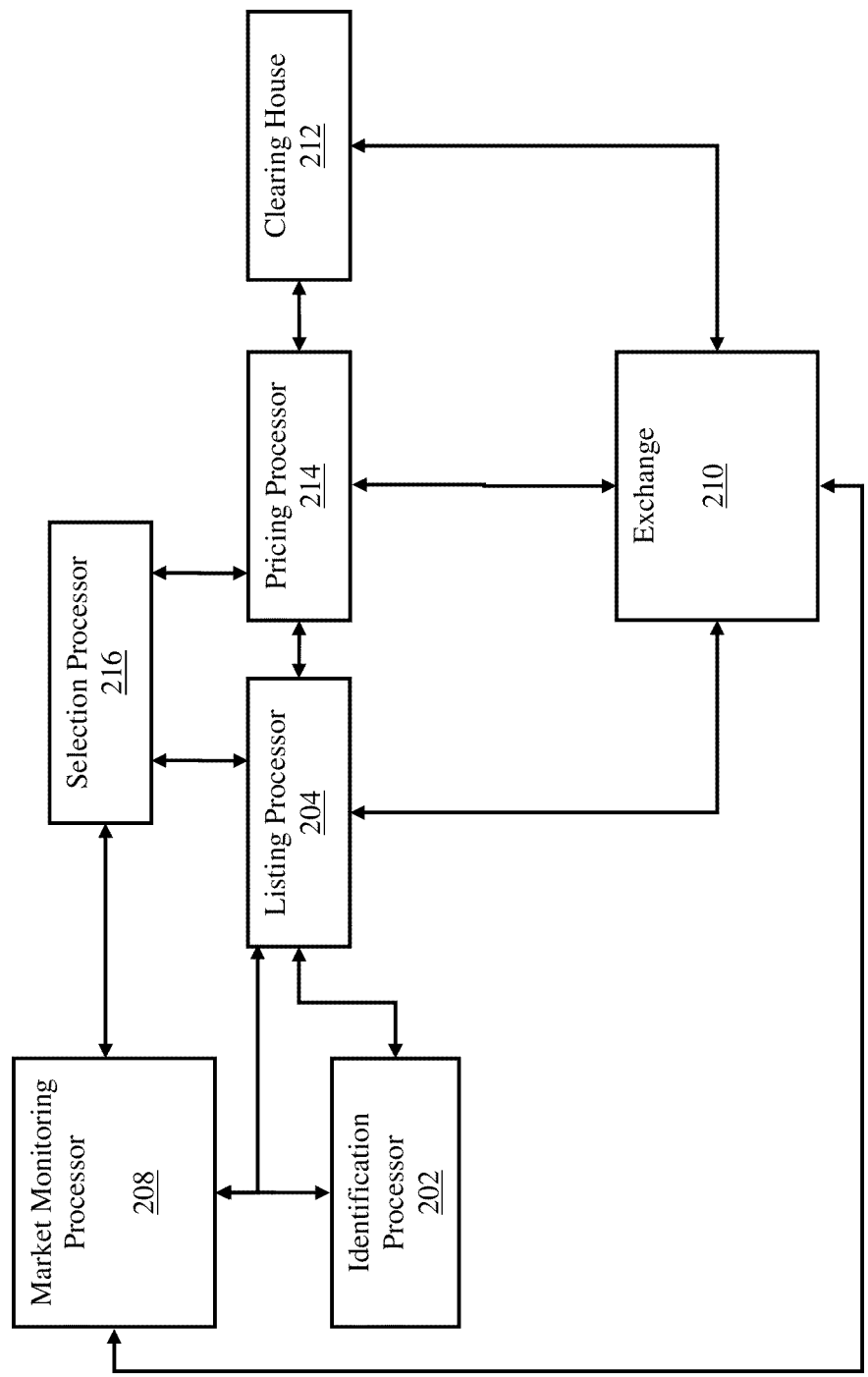
FIG. 2 shows a block diagram of an exemplary system for pricing settlement of a trade of an interest rate futures contract.

The disclosed embodiments relate to a system which calculates a conversion factor (CF) based upon a zero percent (0%) futures contract standard or a zero coupon futures contract standard. The zero percent futures contract standard may be used in the context of futures based upon coupon bearing debt securities including Treasuries, Treasury Inflation Protected Securities (TIPS), agency securities, corporate securities, municipal securities, or any fixed income security. Deployed formulas for calculation of CFs generate an undefined result when a zero percent futures contract standard is utilized. The system also facilitates listing, trading, and settlement of an interest rate futures contract that sets forth such a zero percent futures contract standard. The system may be configured for both interest rate futures contracts utilizing a nonzero percent futures contract standard and interest rate futures contract utilizing a zero percent futures contract standard.

The system that carries out the rules that define the determination of the Treasury futures delivery invoice price for any instrument that qualifies to fulfill the delivery obligation of the treasury future short position holder are referred to as the conversion factor (CF) invoicing system. The CF invoicing system is designed to accommodate the delivery of a wide range of Treasury securities against the contract. E.g., Treasury securities with remaining maturities ranging from 6½ to 10 years may be eligible for delivery vs. 10-Year T-note futures, and Treasury securities with remaining maturities of 25 years or longer may be eligible for delivery vs. the Long-Term T-Bond futures contract. Thus, the short position holder may elect to make delivery of any of a range of securities that may vary widely in terms of both coupon and maturity. Because securities with varying coupon and maturities command different value in the market, the CF invoicing system is applied in an effort to normalize the value. The invoice price paid from long to short upon contract expiry or delivery of securities is the product of the prevailing futures price and the conversion factor:

Invoice Amount=(Futures Price×Conversion Factor)+ Accrued Interest (as exemplified above with respect to Long Term U.S. Treasury Bond Futures and short term U.S. Treasury Note Futures). In addition to the principle invoice amount, as determined by the product of the Futures Price and the appropriate Conversion Factor, the long position holder is required to compensate the short position holder for interest accrued since the last interest payment date for the security that is being tendered for delivery in fulfillment of contract.

The CF associated with a particular security, for delivery into a particular futures contract, may be calculated as the price of the security, in view of its coupon and maturity, to yield a predetermined percentage yield on the first day of the futures contract delivery month. The futures contract may be any type of forward contract as a standardized or non-standardized contract between two parties to buy or sell an asset at a specified future time at a price agreed upon today. The predetermined percentage yield may be referred to as the "futures contract standard" or the conversion factor yield ("CF yield") associated with the futures contract. The CF yield may be arbitrary and may be generally established at levels that may or may not be reflective of current market conditions. However, conditions change.

For example, Chicago Board of Trade ("CBOT") Treasury futures may currently utilize a 6% futures contract standard, whereas prior to the year 2000 CBOT Treasury futures utilized an 8% contract standard. FIG. 1 provides a description of the contract specifications of example Treasury futures contracts. Insofar as a goal of the CF invoicing system is to render all deliverable-grade securities for a given futures contract approximately comparable in terms of economic suitability for use in making delivery, the CF yield that determines such conversion factors ideally would equal the representative market yield among such deliverable-grade securities as of such futures contract's delivery month.

Ideally as well, application of the CF invoicing system would render equally economic the delivery of any eligible security. The trader who is short in the futures contract controls which issue is going to be delivered during the delivery period. The short should select the cheapest-to-deliver security. The size of issuance and market availability varies among each eligible security. The conversion factor is designed to minimize the added cost to deliver the next cheapest security, the third cheapest security, or so on, thereby reducing or eliminating the futures contract's susceptibility to market manipulation.

Practically, a single security typically stands out as the cheapest or most economical to deliver. As a general rule, when yields are in excess of the futures contract standard, the cheapest-to-deliver ("CTD") securities will be long duration (long maturity, low coupon) securities in comparison to other deliverable grade securities. When yields are less than the futures contract standard, the CTD security will tend to be short duration (short maturity, high coupon) securities relative to other members of the contract grade. If market yields on securities that are eligible for delivery into the futures contract happen to be at or very close to the futures contract standard, then these "conversion factor biases" are (theoretically) muted, and potentially several deliverable-grade securities may be equally economic to deliver.

Futures contracts tend to price, i.e. track or correlate, most closely with the CTD security. In a low yield environment, futures tend to price with reference to low duration securities that may be considered to be the most seasoned of all of the futures contracts deliverable-grade securities. However, market participants are typically more interested in recently issued securities that are actively traded and that serve as the Treasury yield curve benchmarks. In this context, it will be appreciated that the "liquidity premium" associated with more recently auctioned Treasury securities tend to drive them to a price premium vs. seasoned securities.

The possibility of a zero percent futures contract standard may have recently been considered impossible or highly unlikely. However, as yields of the underlying interest rate or debt securities and instruments, reach low levels, a zero percent futures contract standard may be appropriate for market conditions. The zero percent futures contract standard must be calculated using a different algorithm than nonzero percent futures contract standards. A first algorithm for calculating conversion factors using a nonzero percent futures contract standard is described by Equation 1.

$$CF = a \times \left[\left(\frac{coupon}{2}\right) + c + d\right] - b \qquad \text{Eq. 1}$$

where $y$ = Futures contract standard in decimals coupon = Annual coupon in decimals of Treasury security $n$ = Number of whole years from $1^{st}$ day of delivery month to maturity (or call) date of Treasury security $z$ = Number of whole months between $n$ and maturity (or call) date, rounded down to nearest quarter for 10-year note, bond, ultra bond; or, nearest month for 2-year, 3-year, 5-year note futures $v = z$ if $z < 7$ or 3 if $z \geq 7$ for TY, US, UB or $(z-6)$ if $z \geq 7$ for TU, 3YR and FV $$a = 1 \Big/ \left(1 + \frac{y}{2}\right)^{v/6}$$

$$b = \left(\frac{coupon}{2}\right) \times \left(\frac{6-v}{6}\right)$$

$$c = 1 \Big/ \left(1 + \frac{y}{2}\right)^{2n} \text{ if } z$$

$$d = \left(\frac{coupon}{y}\right) \times (1 - c)$$

Equation 1 cannot determine a usable conversion factor for a zero percent futures contract standard. In Equation 1, when y=0% or values within a range of 0%, the resultant conversion factor does not reflect the appropriate conversion factor or is otherwise indefinite.

However, this situation may be addressed by applying an alternate formula for identifying the CF when the futures contract standard equals zero as below. This solution represents a closed form transformation of the standard CF calculation, relying upon a finite mathematical method. A second algorithm for calculating conversion factors using a zero percent futures contract standard is described by Equation 2. Because Equation 2 is tailored for the specific value y=0% for the zero percent futures contract standard, the variable 'y' is not included in Equation 2. Instead, the effect of y=0% is incorporated into Equation 2.

$$CF = 1 + \left[coupon \times \left(n + \frac{z}{12}\right)\right] \text{ where} \qquad \text{Eq. 2}$$

Coupon = Annual coupon in decimals of Treasury security $N$ = Number of whole years from $1^{st}$ day of delivery month to maturity (or call) date of Treasury security $z$ = Number of whole months between $n$ and maturity (or call) date, rounded down to nearest quarter for 10-year note, classic bond, ultra bond; or, nearest month for 2-year, 3-year, 5-year note futures The type of futures contract may include, but are not limited to 10-Year Treasury note futures (TY), Treasury bond futures (US), Ultra Treasury bond futures (UB), and 2-Year Treasury note futures (TU), 3-Year Treasury note futures (3YR), and 5-Year Treasury note futures (FV). FIG. 1 illustrates provides a description of the contract specifications of example Treasury futures contracts that may be configured to use either the nonzero percent futures contract standard or the zero percent futures contract standard.

An interest rate futures contract based on a zero CF yield or zero percent futures contract standard may be attractive to various market participants. Specifically, the sensitivity of price movement to changes in yield of such contract would almost always reflect the sensitivity of price movement to changes in yield of the deliverable grade security with longest duration. The CF yield may be described as 1 plus the sum of the security's coupon stream over its remaining term to maturity. For a security with a coupon rate of 10 pct per annum and with 4 years of remaining term to maturity, the 0% CF is 1.4000, equal to 1+(4*0.1). If instead the security has 1 year 5 months of remaining term to maturity, then the 0% CF is 1.1417, equal to 1+((1+5/12)*0.1).

The disclosed embodiments are discussed with respect to Treasury Notes and Treasury Futures contracts, but the disclosed embodiments may be applicable to any futures contracts for any interest rate or debt security or instrument now available or later developed. In addition, Equation 2 above is standardized such that is compatible not only with the 10-Year Treasury Note futures, Treasury Bond futures, Ultra Treasury Bond futures, and 2-Year Treasury Note futures, 3-Year Treasury Note futures, and 5-Year Treasury Note futures, as shown in FIG. 1, but also additional U.S. government securities, as well as securities issued by other sovereign entities. Equation 2 is not tied to the variations between the securities or the rounding or truncation guidelines for specific securities. Accordingly, Equation 2 is compatible with securities issued by the United Kingdom, Germany, France, Italy, Japan, Spain or other sovereign entities. Likewise, Equation 2 may be applied to mortgage securities issued by government sponsored enterprises such as the Federal Home Loan Mortgage Corporation, the Federal National Mortgage Association, or the Federal Home Loan Banks, to supranational securities issued by supranational organizations such as the World Bank, and to municipal bonds, corporate bonds, or agency bonds.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed. Herein, the phrase "coupled with" is defined to mean directly connected to or indirectly connected through one or more intermediate components. Such intermediate components may include both hardware and software based components.

FIG. 2 shows a block diagram of an exemplary system 200 for facilitating listing, trading and/or settlement of an interest rate futures contract that specifies a delivery obligation, which may be satisfied by at least the delivery of any one or more of a set of eligible interest rate or debt securities and instruments within a specified delivery period which may occur subsequent to the undertaking thereof. Each of the set of eligible interest rate or debt securities and instruments may be characterized by an associated coupon and an associated maturity which may be different from the coupon and maturities associated with the others of the set of eligible interest rate or debt securities and instruments. The system 200 may be operated by an Exchange, such as the Chicago Board of Trade or the Chicago Mercantile Exchange, and may be implemented, such as by logic stored in a memory or other tangible and/or non-transitory computer readable medium and executable by a processor, in a computer, such as the computer 400 having a processor 402 and memory 404 as discussed in more detail below.

The system 200 includes an identification processor 202, which may be implemented as logic stored in the memory 404 and executable by the processor 402, operative to identify a contract daily settlement price for an interest rate or debt security or instrument of a set of eligible interest rate or debt securities and instruments, which may be used, at a specified time of delivery of an eligible interest rate or debt security or instrument of the set of eligible interest rate or debt securities and instruments specified by an interest rate futures contract, to compute a price to be paid in exchange for delivery. The contract daily settlement price may be determined by the Exchange 210 for the most recent trading period. Data indicative of the contract daily settlement price may be received by the identification processor 202 from the Exchange 210 directly or indirectly. The identification processor 202 may also be configured to identify a futures contract standard of zero for one of the set of eligible interest rate or debt securities and instruments. The zero futures contract standard may be set by a user or predetermined by the logic of the identification processor 202.

The system 200 may also include a listing processor 204, which may be implemented by logic stored in the memory 404 and executable by the processor 402, coupled with the identification processor 202 and operative to make a set of interest rate futures contracts available for trading, wherein each interest rate futures contract of the set specifies a delivery obligation which may be satisfied by delivery within a specified delivery period, of any one or more of a set of eligible interest rate or debt securities and instruments, and at least one of the interest rate futures contracts includes a CF yield based on a futures contract standard of zero.

The system 200 further includes a pricing processor 214, which may be implemented by logic stored in the memory 404 and executable by the processor 402, coupled with the identification processor 202, and the listing processor 204, and operative to calculate a conversion factor for the futures contract standard of zero at the time of the delivery obligation is satisfied by delivery of one of the set of eligible interest rate or debt securities and instruments. The pricing processor 214 is configured to execute the algorithm described by Equation 2:

$$CF = 1 + \left[\text{coupon} \times \left(n + \frac{z}{12}\right)\right] \text{ where} \qquad \text{Eq. 2}$$

coupon = Annual coupon in decimals of Treasury security $n$ = Number of whole years from $1^{st}$ day of delivery month to maturity (or call) date of Treasury security $z$ = Number of whole months between $n$ and maturity (or call) date, rounded down to nearest quarter for 10-year note, classic bond, ultra bond; or, nearest month for 2-year, 3-year, 5-year note futures The pricing processor 214 is also configured to calculate an invoice amount to be paid in exchange for the delivery of the one of the set of eligible interest rate or debt securities and instruments. The invoice amount (IA) is determined according to Equation 3, wherein the conversion factor (CF) is supplied by Equation 2:

$$IA = (CF \times \$1{,}000 \times \text{Futures Settlement}) + \text{Accrued Interest} \quad \text{Eq. 3}$$

The accrued interest may include interest accrued since the last interest payment date. The interest payments may be monthly, quarterly, or semi-annually. The accrued interest may be calculated using a formula specified by the coupon of the interest rate or debt security or instrument. The system 200 calculates a cash settlement based on the invoice amount and the accrued interest. The cash settlement offsets the difference between the security specified in the futures contract and the specific pricing characteristics of the security that is tendered.

Figure 5:
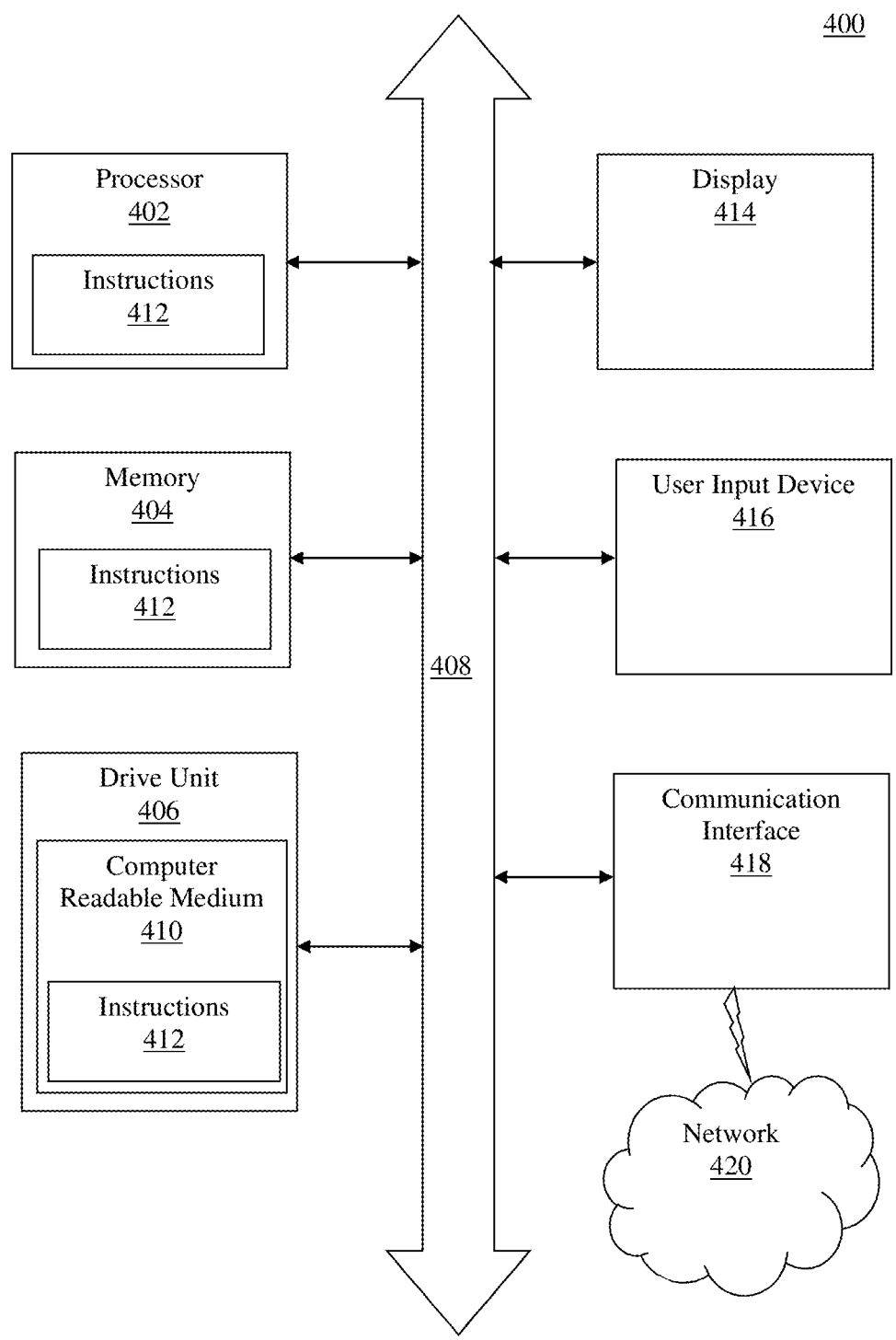
FIG. 5 shows an illustrative embodiment of a general computer system for use with the exemplary system of FIG. 2.

The interest rate futures contracts may be communicated to the Exchange 210 via a network (not shown), such as the network 420 shown in FIG. 5, as one or more data packets comprising one or more parameters describing or otherwise defining the contract in a manner in which the Exchange 210 can list it for trading via an order book therefore.

The system 200 may optionally include a selection processor 216, which may be implemented by logic stored in the memory 404 and executable by the processor 402, coupled with the pricing processor 214, and operative to select and or calculate either a first conversion factor or a second conversion factor depending on whether the futures contract standard for the one of the set of eligible interest rate or debt securities and instruments is zero or nonzero. Similarly, the selection processor may be configured to select either a first algorithm, which incorporates Equation 1, when the futures contract standard is a nonzero value and a second algorithm, which incorporates Equation 2, when the futures contract standard when the futures contract standard is a zero value.

The selection processor 216 may be configured to select either the first conversion factor or the second conversion factor based on a user input or an analysis of market conditions. The user input may be received via user input device 416. The market monitoring processor 208, which may be implemented by logic stored in the memory 404 and executable by the processor 402, coupled with the identification processor 202, the listing processor 204, and the pricing processor 214, and configured to monitor market conditions and supply market condition data to the selection processor 216 for selection of the conversion factor. The selection processor 216 may select either the first algorithm or the second algorithm based on interest rates or other indicators in the market condition data.

In another embodiment, the Exchange 210 may maintain contracts with CF yields that consistently straddle current yields by applying a methodology analogous to the listing of option strike prices. Specifically, the Exchange may identify a standard CF yield interval, e.g., 2%, 1%, 0.5%, etc. If market yields associated with securities of a particular term to maturity should approach the highest or lowest currently listed CF yield level, a further futures contract with another CF yield could automatically be listed. For example, assume that the CF yield interval is established at 2% and that there are contracts available with CF yields at 2%, 4% and 6%. If market yields were to approach 6%, a further contract could be listed with conversion factors determined by a CF yield of 8%. Similarly, if market yields were to approach 2%, a further contract with conversion factors determined by a CF yield of 0%. In addition, multiple futures with various CF yield values may be offered to provide market participants with the option to utilize contracts (or combinations thereof) for which cheapest-to-deliver (or CTD) status, as discussed above, may attach to different members of the ensemble of securities that are eligible for delivery into such futures. For example, for a futures contract that is subject to a conversion factor yield that is low relative to market yields on the contract's deliverable-grade securities, the futures contract price would tend to track the price dynamics of members of the deliverable grade with relatively long duration. Conversely, for a futures contract that is subject to a conversion factor yield that is high relative to market yields on securities eligible for contract delivery, the contract price would tend to the track the price dynamics of members of the contract deliverable grade with relatively short durations. This flexibility could offer significant opportunities in the context of risk management and basis trading strategies and is further consistent with the trend to offering customized products. While futures exchanges have typically attempted to offer standardized products that coalesce liquidity in a single market, the hallmark of the over-the-counter derivative markets is to provide the end user with significant flexibility, facilitated by the availability of cheap computing power.

In another embodiment, a set of unique conversion factor yields may include all possible conversion factor yields, including zero percent, a subset thereof selected by a plurality of traders, such as by voting, and/or a set of unique conversion factor yields selected by other means, such as based on prevailing, extrapolated and/or predicted market conditions. It will be appreciated that while all unique conversion factor yields may be utilized, the large number of contracts created thereby may impact performance of the trading system and/or Exchange. Further, it will be appreciated that not all conversion factor yields may be desirable by traders. Accordingly, in one embodiment, the selection of the set of unique conversion factor yields is selective so as to reduce the computational and administrative load on the trading system and may be based on market/trader demand, as evidenced for example by a popular vote by participating traders, by prevailing market conditions, such as the current yields of the underlying interest rate or debt securities and instruments, by predicted and/or extrapolated market conditions, such as the predicted or extrapolated yields for the underlying interest rate or debt securities and instruments expected to be prevailing during the delivery period(s), and/or by other mechanisms to select a set of conversion factor yields. The identification processor 202 may further include logic configured to automatically select the set of unique conversion factor yields as described and may further update the set, continuously or periodically, as the underlying bases therefore change. For example, where the particular market condition comprises an ensemble of market yields to maturity, with one such yield applying to each member of the set of securities eligible for delivery into such futures contract of the selected interest rate or debt security or instrument, the set of unique conversion factor yields may include a first conversion factor yield which is lower than the some or all of these market yields and a second conversion factor yield which is both higher than the first conversion factor yield and higher than some or all of the market yields. The market monitoring processor 208 is operative to automatically identify the set of unique conversion factor yields and make the set of interest rate futures contracts available responsive to a change in market conditions.

The pricing processor 214 may be coupled with a clearing house 212 of the Exchange 210 to facilitate the delivery process of the particular interest rate or debt security or instrument by transmitting, such as via the network 420, data indicative of the equivalent interest rate or debt security or instrument(s) such that the clearing house 212 may determine that the obligated trader is meeting the delivery obligation. The pricing processor 214 may be configured to compute the price to be paid to a first trader from a second trader upon satisfaction of the delivery obligation specified by the traded interest rate futures contract, the eligible interest rate or debt security or instrument to be delivered having been selected by one of the first trader, the second trader, or a combination thereof from the set of eligible interest rate or debt securities and instruments specified by the traded interest rate futures contract. It will be appreciated that the value of the selected eligible interest rate or debt security or instrument at the time the traded interest rate futures contact is traded may be different then the value of the selected eligible interest rate or debt security or instrument at the time of delivery.

Figure 3:
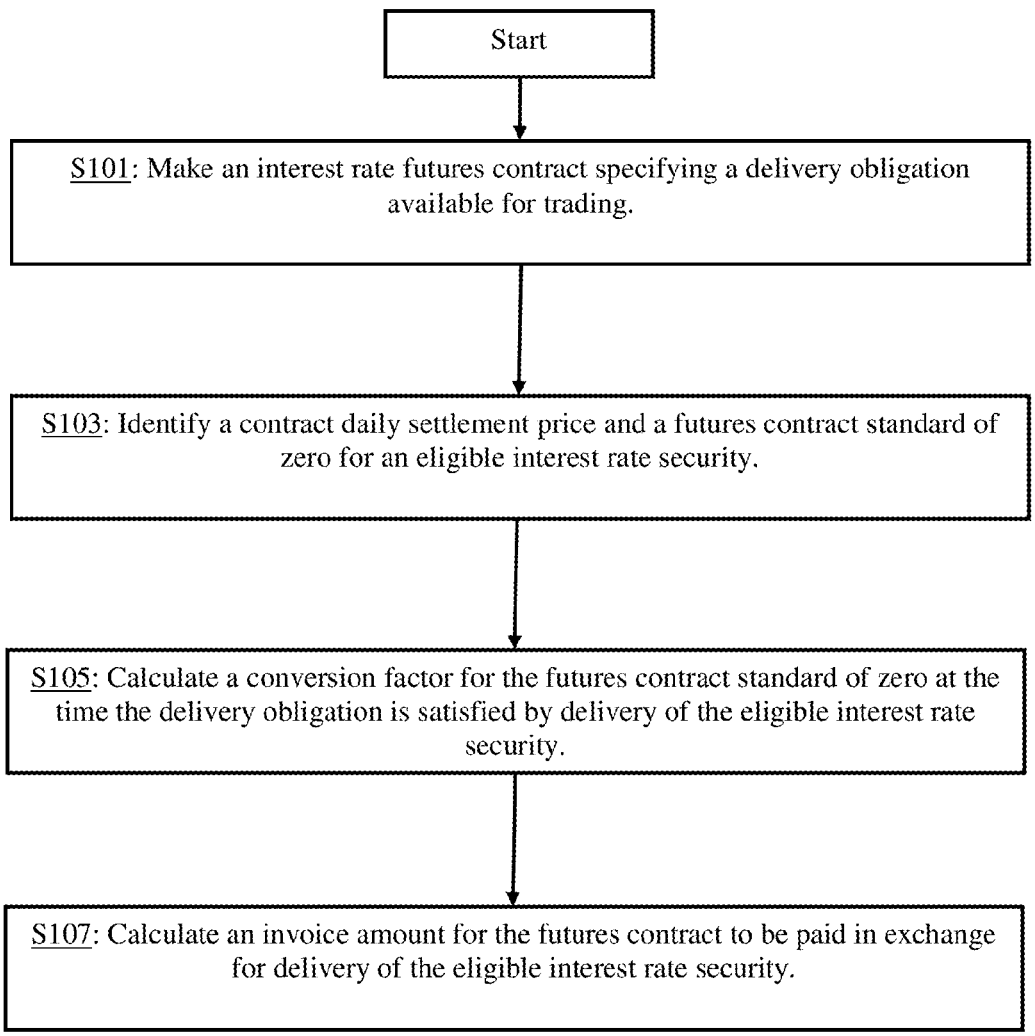
FIG. 3 shows a flow chart depicting exemplary operation of the system of FIG. 2 for pricing settlement of a trade of an interest rate futures contract.

FIG. 3 shows a flow chart depicting exemplary operation of the system 200 of FIG. 2 for facilitating listing, trading and settlement of an interest rate futures contract that specifies a delivery obligation, which may be satisfied by at least the delivery, e.g. subsequent to the undertaking thereof, of any one or more of a set of eligible interest rate or debt securities and instruments within a specified delivery period based on a futures contract standard of zero. The operation of the system 200 includes a computer implemented method for facilitating listing, trading and settlement of an interest rate futures contract that specifies a delivery obligation, which may be satisfied by at least the delivery of any of a set of eligible interest rate or debt securities and instruments within a specified delivery period. Other acts besides those shown in FIG. 3 may be included and one or more acts may be omitted. The acts may be performed in an order that deviates from the order shown in FIG. 3.

At act S101, the system 200 makes a futures contract available for trading. The futures contract specifies a delivery obligation which may be satisfied by delivery within a specified delivery period. The futures contract also specifies a futures contract standard of CF yield. The CF yield is set before the futures contract is made available. The CF yield may be set by user input or based on market conditions.

At act S103, the system 200 identifies a contract daily settlement price and a futures contract standard of zero for one of the set of eligible interest rate or debt securities and instruments. The contract daily settlement price may be received (or otherwise published) by the Exchange 210. The futures contract standard or zero is specified by the futures contract. The eligible interest rate or debt security or instrument may be any coupon bearing debt security such as an agency bond, a corporate bond, a supranational bond or a municipal bond.

At act S105, the system 200 calculates a conversion factor for the futures contract standard of zero at the time the delivery obligation is satisfied by delivery of the one of the set of eligible interest rate or debt securities and instruments. The conversion factor may be calculated according to Equation 2 described above. Because the particular maturity requirements and rounding rules are not included in the calculation of the conversion factor, any fixed income debt security may be used. The eligible interest rate or debt security or instrument may be issued by a county outside of the United States. Interest rate or debt securities and instruments issued by a country outside of the United States may be referred to as foreign bonds.

At act S107, the system 200 calculates an invoice amount for the futures contract to be paid in exchange for the delivery of the one of the set of eligible interest rate or debt securities and instruments. The invoice amount is calculated using the conversion factor for the futures contract standard of zero calculated in act S105 and the contract daily settlement price identified in act S103.

The system 200 may be configured to receive a request to exchange the futures contract from a selling entity to a buying entity. The request may trigger identification of the contract daily settlement price for the coupon bearing debt security, as described in act S103. The request may trigger the calculation of the conversion factor, as described in act S105.

The system 200 may also be configured to facilitate the exchange from the selling entity to the buying entity. Specifically, the system 200 transfers the futures contract to the buying entity and transfers a cash settlement based on the invoice amount to the selling entity.

Figure 4:
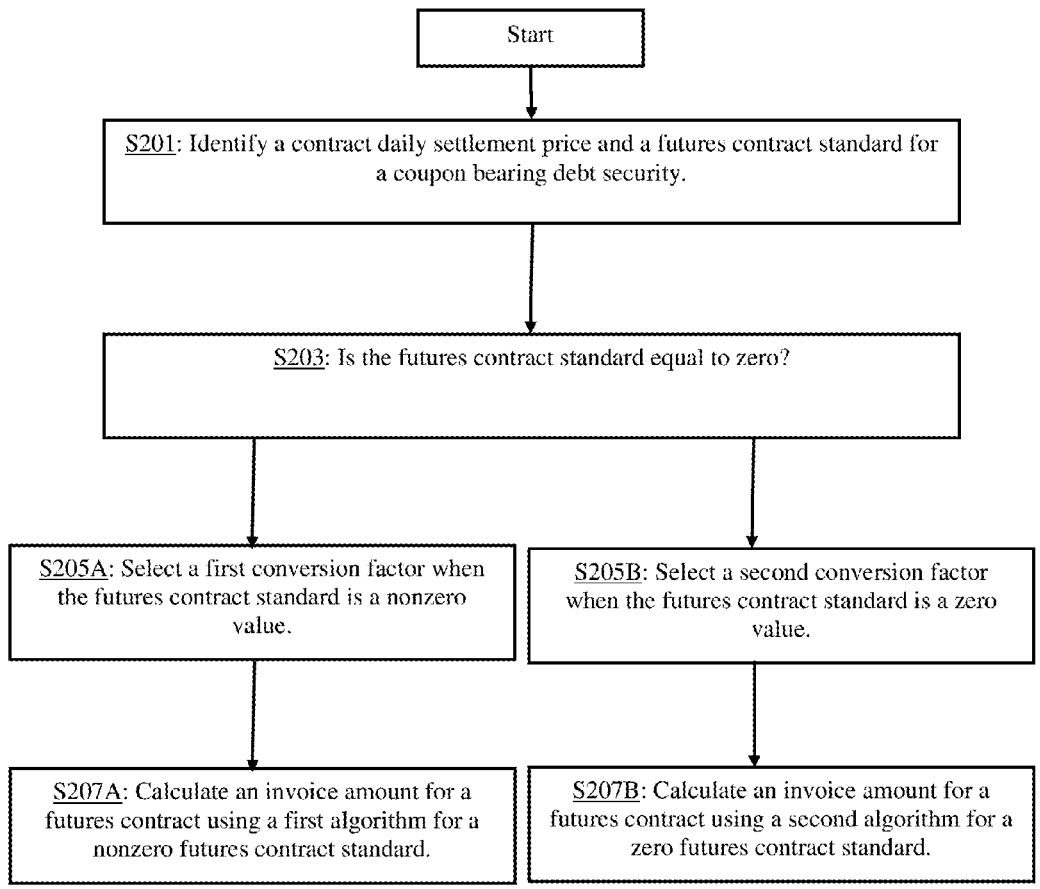
FIG. 4 shows a flow chart depicting another exemplary operation of the system of FIG. 2 for pricing settlement of a trade of an interest rate futures contract.

FIG. 4 shows a flow chart depicting another exemplary operation of the system 200 of FIG. 2 for facilitating listing, trading and settlement of an interest rate futures contract that specifies a delivery obligation, which may be satisfied by at least the delivery, e.g. subsequent to the undertaking thereof, of any one or more of a set of eligible interest rate or debt securities and instruments within a specified delivery period based on a futures contract standard of zero. The operation of the system 200 includes a computer implemented method for facilitating listing, trading and settlement of an interest rate futures contract that specifies a delivery obligation, which may be satisfied by at least the delivery of any of a set of eligible interest rate or debt securities and instruments within a specified delivery period. Other acts besides those shown in FIG. 4 may be included and one or more acts may be omitted. The acts may be performed in an order that deviates from the order shown in FIG. 4.

At act 5201, the system 200 identifies a contract daily settlement price for a coupon bearing debt security and a futures contract standard for the coupon bearing debt security. The contract daily settlement price man change daily as published by the Exchange 210. The futures contract standard may be identified from the terms of the futures contract. At act 5203, the system 200 determines whether the futures contract standard is zero or nonzero. A futures contract of zero may be defined as y=0.00% or within a predetermined range of exact zero such as (+/−0.01%, +/−0.05, +/−0.10).

At act S205A, when the futures contract standard is a nonzero value, the system 200 selects a first conversion factor for a first algorithm, including, for example, Equation 1. At act S205B, when the futures contract standard is a zero value, the system 200 selects a second conversion factor for a second algorithm, including, for example, Equation 2. The system 200 calculates an invoice amount using either the first algorithm (act S207A) or the second algorithm (act S207B).

In one embodiment, the identifying may further include selecting those unique conversion factor yields for inclusion in the set of unique conversion factor yields which, for a particular market condition, a price dynamic of an associated interest rate futures contract, as a function of the unique conversion factor yield, approximates a price dynamic of any of the set of eligible interest rate or debt securities and instruments.

Each conversion factor of the set of conversion factors associated with a particular conversion factor yield may be computed as a price at which a note with the same time to maturity as the associated eligible interest rate or debt security or instrument, and with par on the basis of one (1) point, will yield the associated conversion factor yield per annum.

As discussed above, each of the set of eligible interest rate or debt securities and instruments may be characterized by an associated coupon and an associated maturity which may be different from the coupon and maturities associated with the others of the set of eligible interest rate or debt securities and instruments. Further, the value of the selected eligible interest rate or debt security or instrument at the time the traded interest rate futures contract is traded may be different then the value thereof at the time of the delivery.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the identification processor 202, listing processor 204, pricing processor 214, selection processor 216, or market monitoring processor 208, may be a computer system 400 or a component in the computer system 400. The computer system 400 may implement a match engine 104 on behalf of an exchange, such as the Chicago Mercantile Exchange or Chicago Board of Trade, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

We claim:

1. A computer implemented method comprising:
    identifying a contract daily settlement price for a coupon bearing debt security;
    identifying a futures contract standard for the coupon bearing debt security;
    selecting a first conversion factor when the futures contract standard is a nonzero value;
    selecting a second conversion factor when the futures contract standard is a zero value; and
    calculating, using a processor, an invoice amount for a futures contract to be paid in exchange for the delivery of the coupon bearing debt security, wherein the invoice amount is calculated using the identified contract daily settlement price and using a first algorithm when the futures contract standard is a nonzero value and a second algorithm when the futures contract standard is a zero value; wherein the first and second algorithm are different.

2. The computer implemented method of claim 1, further comprising:
receiving a request to exchange the futures contract from a selling entity to a buying entity, wherein the request triggers identification of the contract daily settlement price for the coupon bearing debt security.

3. The computer implemented method of claim 1, wherein the futures contract is an interest rate contract.

4. The computer implemented method of claim 1, wherein the coupon bearing debt security is a treasury security.

5. The computer implemented method of claim 1, further comprising:
facilitating delivery of the futures contract and a cash settlement based on the invoice amount.

6. The computer implemented method of claim 5, further comprising:
calculating an accrued interest amount based on a previous interest payment date; and determining the cash settlement based on the accrued interest and the invoice amount.

7. The computer implemented method of claim 1, wherein the second algorithm includes calculation of the second conversion factor ($CF_2$) as:

$$CF_2 = 1 + \left[\text{coupon} \times \left(n + \frac{z}{12}\right)\right],$$

wherein the coupon is an annual coupon rate of the coupon bearing debt security, n is a number of whole years from a delivery month to a maturity date, and z is a number of whole months between n and the maturity date.

8. The computer implemented method of claim 1, wherein the first algorithm includes calculation of the first conversion factor ($CF_1$) as:

$$CF_1 = \frac{1}{\left(1+\frac{y}{2}\right)^{\frac{v}{6}}} \times \left[\left(\frac{\text{coupon}}{2}\right) + c + \left(\frac{\text{coupon}}{y}\right)(1-c)\right] - \left(\frac{\text{coupon}}{2}\right) \times \frac{6-v}{6},$$

wherein y is the futures contract standard, the coupon is an annual coupon rate of the coupon bearing debt security, v depends on a type of the coupon bearing debt security, $$c = \frac{1}{\left(1+\frac{y}{2}\right)^{2n}}, \text{ when } z < 7,$$

$$c = \frac{1}{\left(1+\frac{y}{2}\right)^{(2n+1)}} \text{ when } z \geq 7,$$

n is a number of whole years from a delivery month to a maturity date, and z is a number of whole months between n and the maturity date.

9. The computer implemented method of claim 8, wherein v=z when z<7, wherein v=3 when z≥7 for coupon bearing debt securities including at least 10-year T-note futures, classic T-bond futures, ultra T-bond futures, and
wherein v=z−6, when z≥7 for coupon bearing debt securities including at least 2-year T-note futures, 3-year T-note futures, and 5-year T-note futures.

10. The computer implemented method of claim 1, further comprising:
receiving data indicative of a prevailing interest rate; and
automatically determining the futures contract standard based on the prevailing interest rate, wherein either the first conversion factor or the second conversion factor is selected based on the prevailing interest rate or the futures contract standard.

11. The computer implemented method of claim 1, wherein the coupon bearing debt security is an agency bond, a corporate bond, a supranational bond or a municipal bond.

12. The computer implemented method of claim 1, wherein the coupon bearing debt security was issued by an entity outside of the United States.

13. A computer implemented method for facilitating listing, trading and settlement of an interest rate futures contract that specifies a delivery obligation, which may be satisfied by at least the delivery of any of a set of eligible interest rate or debt securities within a specified delivery period, the method comprising:
making, by a processor, the interest rate futures contract available for trading, wherein the interest rate futures contract specifies the delivery obligation which may be satisfied by delivery within the specified delivery period,
identifying a contract daily settlement price and a futures contract standard of zero for one of the set of eligible interest rate or debt securities;
calculating a conversion factor for the futures contract standard of zero at the time the delivery obligation is satisfied by delivery of the one of the set of eligible interest rate or debt securities; and
calculating, by the processor, an invoice amount for the interest rate futures contract to be paid in exchange for the delivery of the one of the set of eligible interest rate or debt securities, wherein the invoice amount is calculated using the conversion factor for the futures contract standard of zero and the contract daily settlement price.

14. The computer implemented method of claim 13, further comprising:
receiving a request to exchange the interest rate futures contract from a selling entity to a buying entity, wherein the request triggers identification of the contract daily settlement price for the coupon bearing debt security.

15. The computer implemented method of claim 14, wherein the request triggers the calculation of the conversion factor.

16. The computer implemented method of claim 14, further comprising:
transferring the interest rate futures contract to the buying entity; and
transferring a cash settlement based on the invoice amount to the selling entity.

17. The computer implemented method of claim 16, further comprising:
calculating an accrued interest amount based on a previous interest payment date; and
determining the cash settlement based on the accrued interest and the invoice amount.

18. The computer implemented method of claim 13, wherein the conversion factor for the futures contract standard of zero (CF) is calculated as:

$$CF = 1 + \left[\text{coupon} \times \left(n + \frac{z}{12}\right)\right],$$

wherein the coupon is an annual coupon rate of the coupon bearing debt security, n is a number of whole years from a delivery month to a maturity date and z is a number of whole months between n and the maturity date.

19. A system for facilitating listing, trading and settlement of an interest rate futures contract that specifies a delivery obligation, which may be satisfied by at least the delivery of any of a set of eligible interest rate or debt securities within a specified delivery period, the system comprising:
- a processor and a memory operatively coupled and configured to execute:
- an identification process to identify a contract daily settlement price and a futures contract standard for a coupon bearing debt security at the specified delivery period of an eligible interest rate or debt security of the set of eligible interest rate or debt securities specified by an interest rate futures contract;
- a selection process to select a first conversion factor for the interest rate futures contract when the futures contract standard is a nonzero value and a second conversion factor for the interest rate futures contract when the futures contract standard is a zero value; and
- a pricing process to calculate an invoice amount for the interest rate futures contract to be paid in exchange for the delivery of the eligible interest rate or debt security, wherein the invoice amount is calculated using the first conversion factor when the futures contract standard is nonzero and using the second conversion factor when the futures contract standard is zero.

20. The system of claim 19, further comprising:
- a listing process to make the interest rate futures contract available for trading, wherein the futures contract specifies the delivery obligation which may be satisfied by delivery within a specified delivery period by any of the set of eligible interest rate or debt securities.

21. The system of claim 19 further comprising:
- a market monitoring process operating to monitor changes in market conditions and automatically define the futures contract standard based on the market conditions.

22. The system of claim 19, wherein the identification process is configured to identify the contract daily settlement price and the futures contract standard for a plurality of coupon bearing debt securities issued from a plurality of sovereign entities.

23. The system of claim 19, wherein the selection process is configured to calculate the second conversion factor (CF) according to:

$$CF = 1 + \left[\text{coupon} \times \left(n + \frac{z}{12}\right)\right],$$

wherein the coupon is an annual coupon rate of the coupon bearing debt security, n is a number of whole years from a delivery month to a maturity date and z is a number of whole months between n and the maturity date.

24. A system for facilitating listing, trading and settlement of an interest rate futures contract that specifies a delivery obligation, which may be satisfied by at least the delivery of any of a set of eligible interest rate or debt securities within a specified delivery period, the system comprising:
- a processor and a memory coupled therewith configured to execute:
- first logic stored in the memory to identify a contract daily settlement price and a futures contract standard of zero for one of the set of eligible interest rate or debt securities;
- second logic stored in the memory to calculate a conversion factor for the futures contract standard of zero at the time delivery obligation is satisfied by delivery of the one of the set of eligible interest rate or debt securities; and
- third logic stored in the memory to calculate an invoice amount for the futures contract to be paid in exchange for the delivery of the one of the set of eligible interest rate or debt securities, wherein the invoice amount is calculated using the conversion factor for the futures contract standard of zero and the contract daily settlement price.

25. A system for facilitating listing, trading and settlement of an interest rate futures contract that specifies a delivery obligation, which may be satisfied by at least the delivery of any of a set of eligible interest rate or debt securities within a specified delivery period, the system comprising:
- means for identifying a contract daily settlement price and a futures contract standard of zero for one of the set of eligible interest rate or debt securities;
- means for calculating a conversion factor for the futures contract standard of zero at the time delivery obligation is satisfied by delivery of the one of the set of eligible interest rate or debt securities; and
- means for calculating an invoice amount for the futures contract to be paid in exchange for the delivery of the one of the set of eligible interest rate or debt securities, wherein the invoice amount is calculated using the conversion factor for the futures contract standard of zero and the contract daily settlement price.

* * * * *